(12) United States Patent
Bantner

(10) Patent No.: US 7,333,031 B1
(45) Date of Patent: Feb. 19, 2008

(54) ILLUMINATED KEYBOARD

(75) Inventor: John A. Bantner, Jacksonville, OR (US)

(73) Assignee: Revocable Living Trust Agreement of John Allen Bantner, Portland, OR (US)

( * ) Notice: Subject to any disclaimer, the term of this patent is extended or adjusted under 35 U.S.C. 154(b) by 430 days.

(21) Appl. No.: 10/939,068

(22) Filed: Sep. 9, 2004

(51) Int. Cl.
*H03M 11/00* (2006.01)
*G09G 5/00* (2006.01)

(52) U.S. Cl. .......................... 341/22; 345/170
(58) Field of Classification Search ................ 345/170, 345/83; 362/85, 23–30; 341/22, 150
See application file for complete search history.

(56) References Cited

U.S. PATENT DOCUMENTS 5,278,542 A * 1/1994 Smith et al. ................ 345/690
2004/0159779 A1 * 8/2004 Duff .......................... 250/221
2006/0022951 A1 * 2/2006 Hull .......................... 345/170
2006/0103612 A1 * 5/2006 Ozaki ......................... 345/83

* cited by examiner

*Primary Examiner*—Jeffery Hofsass
*Assistant Examiner*—Sigmund Tang
(74) *Attorney, Agent, or Firm*—Alleman Hall McCoy Russell & Tuttle LLP

(57) ABSTRACT

Method and apparatus for illuminating selected keys on a computer keyboard. The illumination color, intensity, duration and the blink rate for each key are under the control of the computer. Key select codes from the computer are mapped onto the keyboard matrix such that any computer key code can select any key on the keyboard. Multiple keys can be illuminated by time multiplexing the illumination drivers to the key matrix in a manner such that the intensity of any key does not vary regardless of the number of keys that are illuminated.

6 Claims, 4 Drawing Sheets

```
new memory map
    address              description
   0 0000 xxxx xxxx      key matrix (3 row, 5 column)
   0 0001 xxxx xxxx      red color for key n
   0 0010 xxxx xxxx      green color for key n
   0 0011 xxxx xxxx      blue color for key n
   0 0100 xxxx xxxx      duration period for key n (# frames)
   0 0101 xxxx xxxx      duration period counter for key n
   0 0110 xxxx xxxx      intensity fraction for key n
   0 0111 xxxx xxxx      blink counter for key n, MSB is blink
   0 1000 xxxx xxxx      blink light on value for key n (# frames)
   0 1001 xxxx xxxx      blink light off value for key n (# frames)
   0 1010 xxxx xxxx      color fading rate
   0 1011 xxxx xxxx      color fading fraction (accumulated color fade rate)
   0 1100 xxxx xxxx      color sequence update rate for key n (# frames)
   0 1101 xxxx xxxx      color sequence state for key n (# frames)
   0 1110 000y yyyy      list of active keys (currently 32 max)
   0 1110 01yy yyy0      red idac value for list entry y (12 bits)
   0 1110 10yy yyy0      green idac value for list entry y (12 bits)
   0 1110 11yy yyy0      blue idac value for list entry y (12 bits
   0 1111 0000 0000      # keys illuminated = n (# keys in list)
   0 1111 0000 0001      pointer to current key in list of active keys
   0 1111 0000 0010      stored character following a command
   0 1111 0000 0011      ram read/write address lsbs
   0 1111 0000 0100      ram read/write address msbs
   0 1111 0000 0101      rate multiplier accumulator for advancing list pointer
   0 1111 0000 0110      global dimming fraction
   0 1111 0000 0111      global backlight value
   0 1111 0000 1000      global key switch debounce value
   0 1111 0000 1001      global key repeat delay value
   0 1111 0000 1010      global key repeat value
   0 1111 0000 1011      model # (from led matrix connector)
   0 1111 0000 1100      firmware version # (from led matrix)
   1 0000 zzzz zzzz      key switch state 0, 0, 0, 0, repeat, repeat delay,
                         debounce, switch state
   1 0001 zzzz zzzz      key switch state counter
   1 0010 zzzz zzzz      switch matrix lower case redirect
   1 0011 zzzz zzzz      switch matrix upper case redirect xxxx xxxx    character being processed
              y yyyy     pointer to active key list
            zzzz zzzz    key switch row and column address
```

FIG. 4

ILLUMINATED KEYBOARD

FIELD OF THE INVENTION

The present invention relates broadly to keyboards used with computer systems. Specifically, the present invention relates to illumination of keys on a computer keyboard. More specifically, the present invention relates to illumination of keys on a keyboard such that the illumination of individual keys is controlled with respect to color, intensity, duration, blink rate, and other factors.

BACKGROUND OF THE INVENTION

Traditional computer keyboards incorporate alphabetic and numeric keys, referred to collectively as alphanumeric keys. These keyboards observe a convention known as "QWERTY," in which alphanumeric keys are laid out in a specific fashion to aid a computer user to type text. In addition to alphanumeric keys, computer keyboards also incorporate a row of function keys located above the alphanumeric keys, as well as a keypad, located to the right of the alphanumeric keys. Various other keys, such as control keys, cursor arrow keys, and other keys are also often included on the keyboard.

Functionality of the keyboard is limited to the functions ascribed to the individual keys, and sometimes allows a mode shift, in which certain keys take on more than one function when keys are depressed in a certain sequence, such as a control key being depressed before another key is depressed.

However, a key's functionality is not intuitive to a user; a user must learn and retain the meaning of function keys as well as the sequencing of keystrokes to realize input functionality beyond the plain meaning of alphanumeric keys. Additionally, conventional keyboards fail to use illumination as a user interface. The human eye is very receptive to illumination, as well as color, and such an interface to a computer keyboard would allow a more intuitive user experience that would not require a user to learn and retain as much specific information for key functionality.

SUMMARY OF THE INVENTION

The present invention provides a method and apparatus for mapping a computer keyboard code set onto a keyboard key matrix such that any computer keyboard code can illuminate any key on the keyboard. In an aspect of the present invention, programmable color illumination for a selected key on a computer keyboard is provided that is independent of the color of any other key on the keyboard. In another aspect of the present invention, a programmable intensity for a selected key on the keyboard is provided that is independent of the intensity of any other key on the keyboard. A programmable fade for gradually reducing the intensity of a selected key may be provided that is independent of the fade for any other key on the keyboard. A programmable timeout for terminating the illumination of a selected key may be provided that is independent of the timeout for any other key on the keyboard. The illumination of a selected key can be maintained until either a computer issues a keyboard code that terminates illumination for the selected key, a timer assigned to the selected key has timed out, the selected key has faded to the point of no illumination, or the key becomes the oldest entry in a list of illuminated keys and is pushed off the list by a new entry. The fading of a selected key is controlled independently of the fading of any other key with the fade rate being programmable. In yet another aspect, blinking or flashing of a selected key is controlled independently of blinking of any other key with the blinking illuminated period and blanked period both being programmable.

In yet another aspect, the present invention provides a constant illumination intensity for each key regardless of the number of keys that are illuminated. In yet another aspect, the present invention provides for a selected key to sequence through 768 colors at a rate specific to that key without requiring further interaction from the computer. In yet another aspect, a global programmable intensity control is provided that serves as both a keyboard dimmer and a keyboard blanking switch. In still another aspect, the present invention provides a programmable back light illumination for the computer keyboard. In yet another aspect of the present invention, vibration feedback on the keyboard is controlled by a computer keyboard code.

These and other features of the present invention are implemented by a keyboard light emitting diode (LED) illumination controller that drive a keyboard row and column matrix of three-color LEDs where the drive current provided to the rows and columns is determined by the selected key, the key color desired, the key intensity level, the fading intensity level, the number of keys currently being illuminated and the global intensity level.

Other features and advantages of the present invention will be apparent from reading the following detailed description, when considered in conjunction with the accompanying drawings in which:

BRIEF DESCRIPTION OF THE DRAWINGS

FIG. 4 illustrates a keyboard memory map in accordance with the present invention.

DETAILED DESCRIPTION

Figure 1:
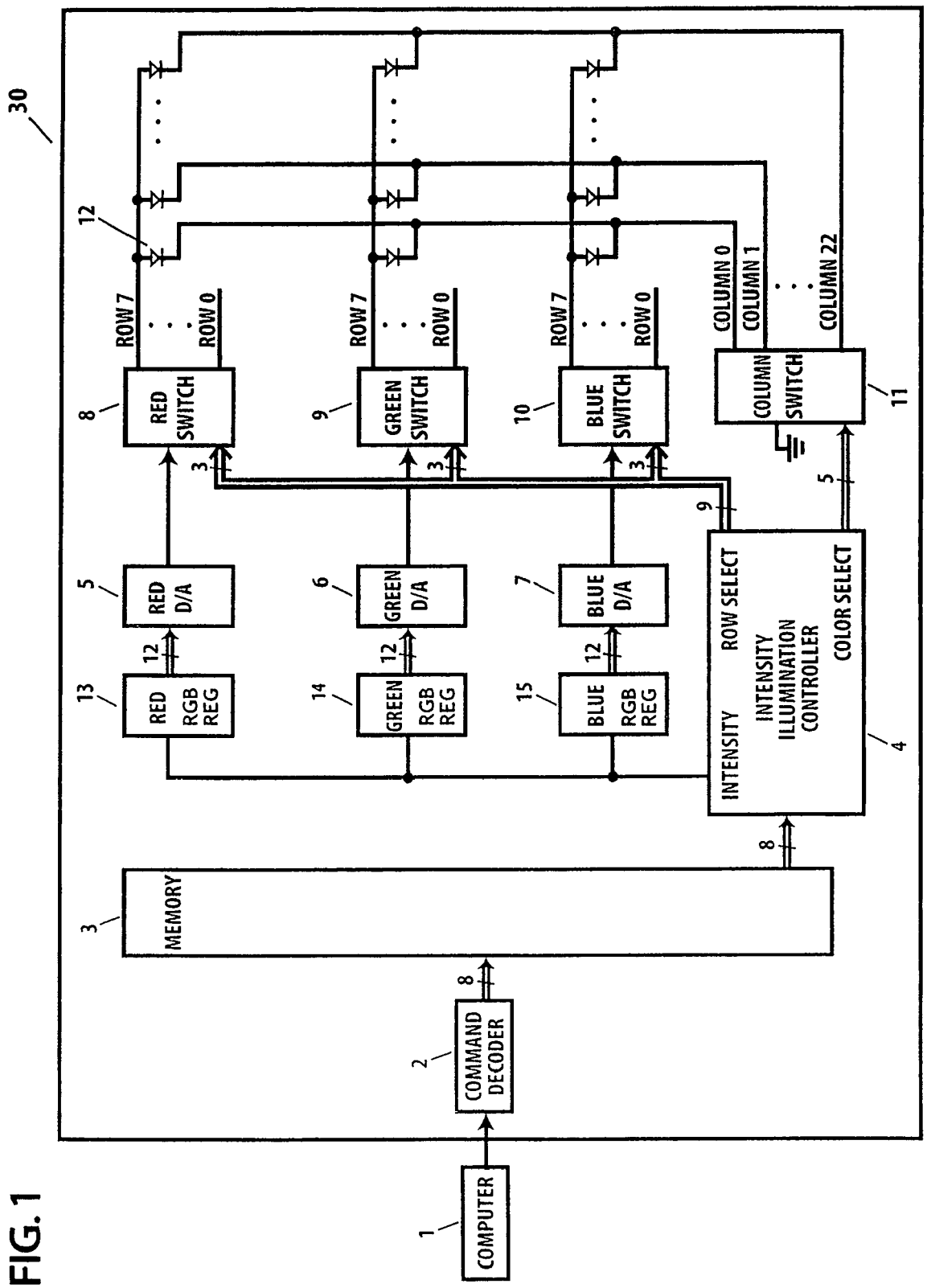
FIG. 1 illustrates in block diagram form the flow of information from a data processing system to a keyboard key matrix for the illumination of a selected key.

The block diagram of FIG. 1 indicates generally the flow of information from a computer 1 to keyboard key matrix 12 to keyboard 30 for the illumination of a selected key's red, blue and/or green LEDs by steering selectable currents from current digital to analog converters (DACs) 5,6,7 through row switches 8,9,10 into LEDs having ground connections that are provided by column switch 11.

In an embodiment, keyboard key matrix 12 is organized as eight rows by 32 columns (rows and columns omitted from drawing for clarity) with the row and column switches arranged such that only one key (red, blue and green LEDs) can be illuminated at any one time.

The keyboard mentioned above, further comprises a plurality of rgb registers 13, 14 and 15, the rgb registers 13 14 and 15 containing values related to current levels passed through circuits in the matrix.

A plurality of rgb registers comprises an rgb register for red illumination values, an rgb register for green illumination values, and an rgb register for blue illumination values. The rgb counters may indicate at least one current digital to analog converter to be deactivated.

The amount of light emitted by an LED is directly related to the current passing through it. The amount of light seen by the eye is a function of the amount of light put out by the LED and the amount of time that the LED is emitting the light. If a current I is applied to a LED for time t1 then an illumination intensity of L is generated. If a current of 2I is applied to the LED for a period of ½ t1 then the same illumination intensity L is generated. Therefore if n keys are to be illuminated then each key will be driven by nI from the current DACs and each key will be selected for a period of 1/n t1 so that all keys will have the same illumination intensity as if they were the only key selected.

Figure 2:
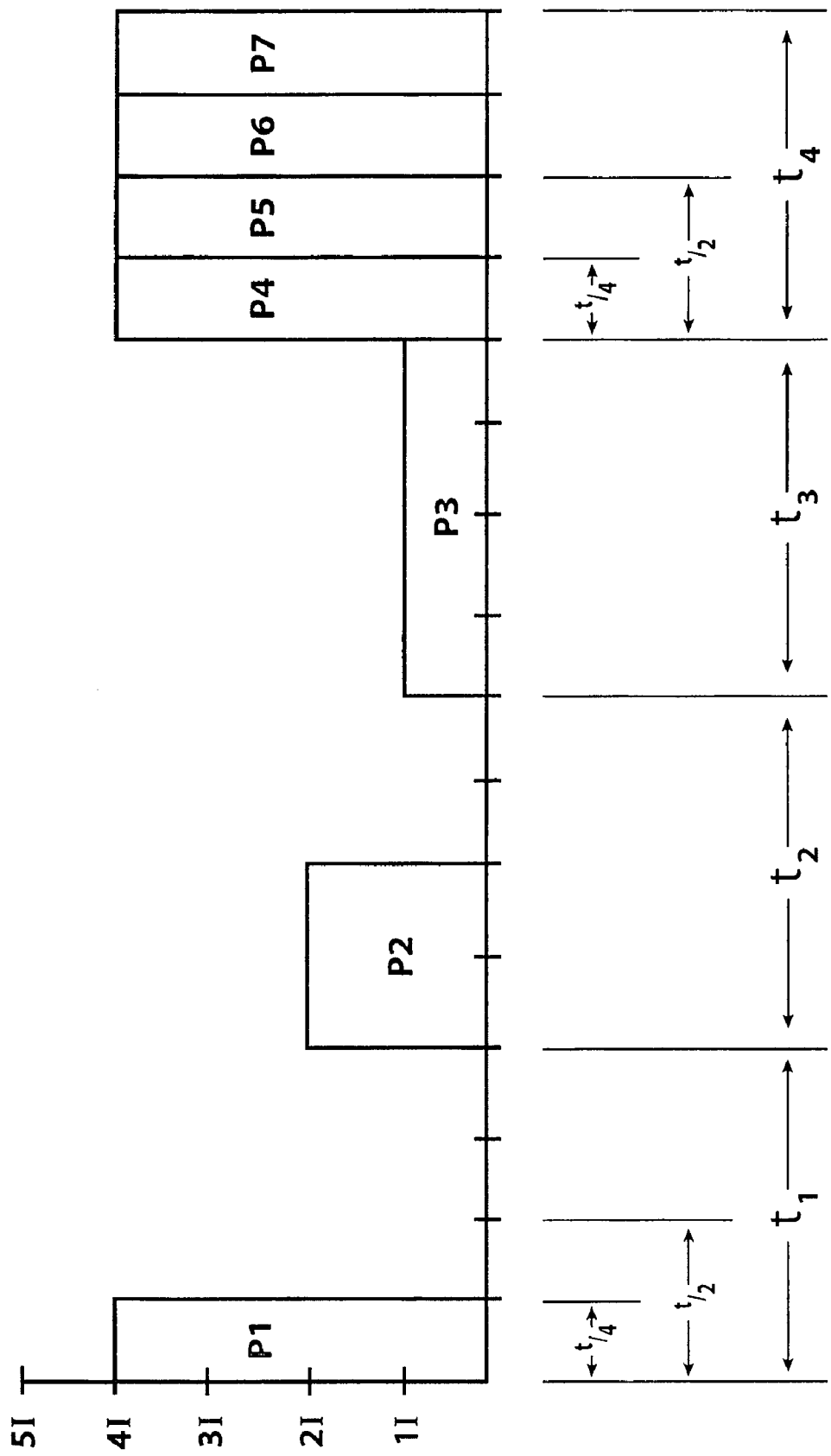
FIG. 2 illustrates in graph form LED illumination and intensity as a function of time.

In FIG. 2, the seven LEDs (P1-P7) are all emitting the same amount of light as detected by the human eye. Even though the current levels through the different LEDs vary considerably, each LED is dissipating the same amount of power since power is a function of time. During t4, LEDs P4-P7 are each emitting the same amount of light as P3 is emitting during t3. If t4 is continuously repeated and is less than $\frac{1}{40}$ second then LEDS P4-P7 will be illuminated (without flicker detectable by the human eye) at the same intensity as would P3 if it was illuminated continuously. The result is that even though only one LED is being illuminated at any one time, the current levels of the illuminated LEDs can be varied (depending on the number of LEDs illuminated) to make the appearance of multiple LEDs being simultaneously illuminated (providing all LEDs are illuminated within the $\frac{1}{40}$ second frame period). In this embodiment, the selected value of t1 is 0.025 sec so that all selected keys will be serviced 40 times per second. 40 illuminations/sec convinces the human eye that the LED is continuously illuminated. The t1 period is divided into n illumination periods where n is the number of LEDs currently in the list of active keys. During each time period, every key in the list is processed and each of those keys are provided with the same amount of illumination time even if the key is in the blanked interval of its blinking cycle. The basic values of the current DACs for a specific key is provided by the computer and is the value that assumes only that key is being illuminated. As additional keys become illuminated, the illumination controller multiplies the stored current DAC values for the selected key by the number of keys active to provide the values actually sent to the current DACs. Each selected key is illuminated for 0.025/n seconds before the illumination controller advances to the next illuminated key, which may be the same key if only one key is selected for illumination.

In an embodiment, illumination controller 4 may include separate global intensity controls, one for backlighting global intensity control of a plurality of backlighting LEDs on keyboard 30, and another global intensity control for the keys on keyboard 30.

The color of any selected key is determined by the relative magnitudes of the red, blue and green current DACs. If the current DACs are 12 bits and 24-bit color is desired (8 bits each for red, green and blue) then only the top 4 bits output from the current DAC are available for servicing up to 16 illuminated keys. If 21-bit color is sufficient then the top 5 bits from the current DAC are available for servicing up to 32 illuminated keys. Other configurations can be realized using this model.

Each key can have an intensity of less that its standard maximum illumination by having the current DAC value for the selected key multiplied by the intensity fraction of the selected key. This provides 406 separate intensity levels for each key that are independent of the intensity levels of any other key.

A fade function is provided whereby the intensity of an illuminated key is diminished each illumination period by multiplying the intensity with its associated fade faction and using the product as the new intensity used in the next illumination period. If the result of the multiplication is zero (or less) then the key illumination is terminated and the key is removed from the active key list.

Each key can have its own intensity duration. When computer 1 illuminates a key the selected keys corresponding duration period is loaded into the duration work counter. Each subsequent illumination period of the selected key decrements the duration work counter until the duration work counter has gone to zero at which time the selected key is removed from the held key list. The duration work counter is decremented each illumination period for the selected key regardless of whether blinking has disabled illumination or not. If the duration period for the selected key is zero, then the key will remain illuminated until either the selected key is removed from the active key list or if the selected key is not in the active list then it will stay illuminated until the next key is illuminated by computer 1.

A list of illuminated keys is maintained in memory 3. Computer 1 can add a key to the list or remove a key from the list. The list can be specified to be a certain length and if adding a key to the list exceeds that length then the oldest key is removed from the list.

Each key can have a blinking function where both the visible period and the blank interval are under computer control. Each illumination period of the selected key causes a single decrement of the blink counter maintained in memory 3. When the blink counter reaches 0, the blink counter is reloaded with either the blink-on or blink-off value depending upon whether the key is illuminated or blanked. When the selected key is blanked the current DAC is loaded with O's, otherwise the normal current DAC value is loaded. If the visible period for the selected key is zero blinking is disabled. The blink duty cycle is the ratio of the visible period to the sum of the visible period and the blank interval.

Each key can be selected to sequence through a fixed set of colors whose period is programmable. Illumination controller 4 advances the color at the end of each illumination period for that key. The color sequencer has 768 possible colors, which at 40 illuminations per second would take slightly longer than 30 seconds to complete illumination of the sequence. The programmable sequence value is a fractional multiplier that reduces the 30-second period by skipping some of the possible colors. The colors skipped are intermediate colors so that the sequence will still cover the red to violet range. A sequence value of 0 disables the color sequencing. The global illumination of the keys on the keyboard is controlled by a global key intensity which is a scale fraction applied to every value sent to the current DACS. The value of the scale fraction then provides a dimming function for the entire keyboard with all keys retaining their relative brightness. A value of 0 blanks the entire keyboard.

Figure 3:
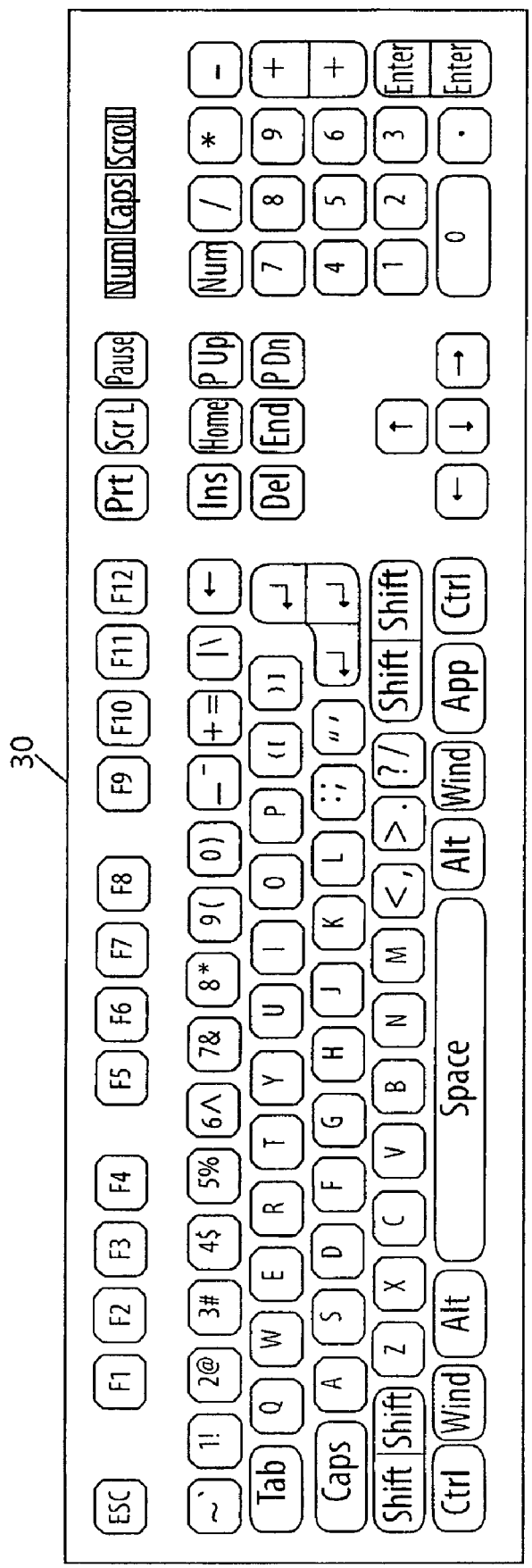
FIG. 3 illustrates an exemplary keyboard for use in accordance with the present invention.

Directing attention to FIG. 3, in an embodiment, backlight illumination of keyboard 30 is provided by a current DAC that drives white LEDs 32 that are positioned behind keyboard 30, the number of LEDs varies depending on the maximum backlight desired. The current DAC allows the intensity of the backlight to be programmable with all white LEDs receiving the same current.

A value of 0 turns the backlight off. In an embodiment, vibrator motor is attached to the front of the keyboard and is located in the key mapping RAM as ff(hex) or as key location row 7 and column 31. The vibrator motor is controlled in the same manner as any key except that it does not respond to any intensity of color commands.

The embodiment described above uses a time base of 0.025/n sec as the illumination period for n selected LEDs. The current DAC values for the LEDs are determined by the color of the selected key (red, green, blue) multiplied by the number of keys illuminated, multiplied by the selected key intensity fraction, multiplied by the fade fraction, multiplied by the global dimming fraction and whether the blinking provision allows the key to be illuminated during the current illumination period.

Another scheme exists whereby the 0.025/n sec illumination period is divided by 256 so that 256 clock ticks can be generated during the 0.025/n period. In this scheme the current DAC values for each color are loaded with the same value representing the number of active illuminated keys. Each red, green and blue color value of the selected key is multiplied by the selected key intensity fraction, then multiplied by the selected key fade fraction, then multiplied by the global dimming fraction and loaded into a 8 bit down counter. The 8-bit down counter is cleared if it is the blanking interval of a blinking key. The color is then determined by counting down the red, green and blue values during the 256 clock illumination period. As each count goes to zero the current DAC for that color is turned off. The use of counters to determine the color requires more hardware logic but allows more keys to be simultaneously illuminated as the current DACs require fewer input bits.

In an embodiment of the present invention, the computer keyboard code structure for loading all parameters into keyboard illumination controller 4 consists of a control byte followed by one to four data bytes. Table 1 describes an exemplary implementation.

TABLE 1

| byte 1 | byte 2 | byte 3 | byte 4 | byte 5 | description |
|---|---|---|---|---|---|
| f0 | sw matrix | redirect | — | — | lower key switch table (row, col) to ascii |
| f1 | sw matrix | redirect | — | — | upper key switch table (row, col) to ascii |
| f2 | — | — | — | — | reserved |
| f3 | debounce | rpt delay | repeat | — | switch global parameters |
| f4 | adr lsb | adr msb | data | — | write ram |
| f5 | adr lsb | adr msb | — | — | read ram |
| f8 | character | row & col | — | — | set char matrix |
| f9 | character | red | green | blue | set color |
| fa | character | blink-on | blink-off | — | set blink rate |
| fb | character | intensity | — | — | set key intensity |
| fc | character | timeout | — | — | set timeout |
| fd | character | sequence | — | — | set sequence rate |
| fe | dim | back light | — | — | set global intensity |
| ff | hold | character | — | — | set/clear hold char |

In this embodiment, the f0 control byte is followed by an address byte (sw_matrix) that is used as a row and column address to the key switch mapping ram where the following byte (redirect) is written. This command writes only the lower half (lower case) of the key switch redirect RAM.

The f1 control byte is followed by an address byte (sw_matrix) that is used as a row and column address to the key switch mapping ram where the following byte (redirect) is written. This command writes only the upper half (upper case) of the key switch redirect RAM.

The f3 control byte is followed by the global key switch parameters. The first byte following the command is the global debounce period that is applied to both the closing of a key switch and the opening of a key switch. The key switch must be debounced prior to the keyboard sending any keystrokes to the computer 1. The second byte indicates the repeat delay period which is the amount of time the debounced switch must be closed before the keyboard starts to send repeated key strokes to the computer 1. The third byte indicates the amount of time between sending repeated key strokes to the computer 1.

The f4 control byte is followed by a 2-byte address used for writing the following byte (data) into the keyboard RAM.

The f5 control byte is followed by a 2-byte address for reading any location from the RAM residing on the keyboard. Issuing this command always results in two bytes being sent from the keyboard to the computer 1. The 1st byte is always ff(hex) and is then followed by the byte read from the keyboard RAM. The ff(hex) byte is necessary to differentiate whether the RAM read byte from a key switch read (a redirect value of ff(hex) is illegal with respect to the upper or lower key switch tables.

The f6 control byte is followed by a global back light byte (backlight) dim that sets the programmable intensity of keyboard back lighting.

The f7 control byte is followed by a global dimming byte (dim) that scales the illumination intensity for all the keys.

The f8 control byte is followed by a character byte (character) that is used as an address to a mapping ram where the subsequent row and column byte (charxy) is written. When the computer then sends an illumination character (character) to the keyboard the character (character) is used as the address to the mapping ram so that the LED at key matrix (charxy) is illuminated. It is possible that multiple illumination characters can have the same charxy entry in the mapping ram so that multiple illumination characters can illuminate the same key. The illumination character mapping function allows any computer keyboard code set (ASCII, EBCDIC, proprietary, etc.) to correctly illuminate the desired key.

The f9 control byte is followed by a character byte (character) that is used as an address to the color ram where the subsequent red, blue and green color bytes are stored. The red, blue and green color values determine which of the 16,772,216 (8-bit) possible colors is to be displayed by this character.

The fa control byte is followed by a character byte (character) that is used as an address to the blankng ram where the subsequent illumination period (blink-on) and blanking period (blink-off) are stored. A blink-on value of 0 disables the blinking function for that specific key.

The fb control byte is followed by a character byte (character) that is used as an address to the key intensity ram where the subsequent key intensity fraction is stored.

The fc control byte is followed by a character byte (character) that is used as an address to the key timeout ram where the subsequent key timeout value is stored. A timeout value of 0 disables the timeout down counter for that specific key.

The fd control byte is followed by a character byte (character) that is used as an address to the sequence ram where the subsequent sequence rate value is stored. The color sequence rate value determines the time allowed to cycle through all the sequence colors before restarting the color sequence. A color sequence value of 0 disables color sequencing for that specific key.

The fe control byte is followed by a character byte (character) that is put on the list of held illuminated keys.

The ff control byte is followed by a character byte (character) that is removed from the list of held illuminated keys.

Keyboard command decoder 2 can receive control data bytes from either a USB port or a serial port located on computer 1. Keyboard command decoder 2 utilizes an internal state machine to decode the control data bytes and stores the data fields in memory 3. The illumination controller 4 is a state machine that processes one selected key each illumination period. The state machine executes instructions based solely on the contents of the keyboard memory that have been loaded by keyboard command decoder 2. The keyboard memory map of memory 3 is organized as illustrated in FIG. 4.

The matrix of rows and columns specifies each key on the keyboard and its associated 3-color LED. The rows are connected to the LED anode and one side of the key switch while the columns are connected to the LED cathode and the other side of the key switch. The same row and column printed circuit board matrix is used for both providing current to the LEDs and for reading the state of the key switches. The key switches are sampled at the end of each illumination period when no LED is illuminated. Key switch sampling is accomplished by utilizing the fact that a blue LED does not start conducting appreciable current until the voltage applied to it exceeds 4 volts. The blue current DAC is programmed to output a small current (less than 1 ma) to a selected row during key switch sampling that is not sufficient to turn on the blue LED but will cause the voltage across the blue LED to rise to at least 2.4 volts if the key switch is not closed and the column is selected. If the key switch is closed and the column is selected then the blue DAC current is shorted to ground and 0 volts will appear at the current DAC output.

By sequencing through all the blue rows and all the columns the state of all the key switches can be determine by monitoring the output of the blue DAC where 0 volts indicates a closed switch while 2.4 volts indicates an open switch. A global debouncing time is applied to the closure or opening of a switch. When a switch has been closed and debounced then the row and column number of that switch is used as an address to one of two lookup tables (lower or upper case) where the row and column values are translated into computer key codes recognized by the computer 1. Thus any key switch on the keyboard can be programmed as any computer input key code. The ability to make the key switches programmable allows a single hardware design to handle many different keyboard layouts including different languages.

While a method and apparatus for administering illumination of independent keys on a computer keyboard have been described and illustrated in detail, it is to be understood that numerous modifications can be made to various embodiments of the present invention without departing from the spirit thereof.

What is claimed is:

1. A keyboard for use with a computer system, the keyboard comprising:
   a plurality of keys, each key in the plurality having a red LED, a green LED and a blue LED;
   a matrix of circuits comprising connections to the LEDs of individual keys in the plurality;
   a port to receive a code from the computer system,
   an instruction decoder that selectively connects individual circuits in the matrix to a power source in response to a code received from the computer system; and
   at least one current digital to analog converter to be operatively coupled with the LEDs, the current digital to analog converter to adjust power to the selectively connected individual circuits.

2. The keyboard of claim 1, wherein selectively connecting circuits comprises illuminating one of the LEDs of an individual key more than the other LEDs.

3. The keyboard of claim 1, wherein the plurality of current digital to analog converters comprises a current digital to analog converter for the red LED, a current digital to analog converter for the green LED, and a current digital to analog converter for the blue LED.

4. The keyboard of claim 3, further comprising a plurality of rgb registers, the rgb registers containing values related to current levels passed through circuits in the matrix.

5. The keyboard of claim 4, wherein the plurality of rgb registers comprises an rgb register for red illumination values, an rgb register for green illumination values, and an rgb register for blue illumination values.

6. The keyboard of claim 4, wherein the rgb registers indicate at least one current digital to analog converter to be deactivated.

* * * * *